United States Patent [19]

Davis

[11] Patent Number: 5,713,076
[45] Date of Patent: Feb. 3, 1998

[54] INSECT BARRIER HEADGEAR

[76] Inventor: Michael D. Davis, 202 Swan Point Rd., Snead's Ferry, N.C. 28460

[21] Appl. No.: 728,560

[22] Filed: Oct. 10, 1996

Related U.S. Application Data

[62] Division of Ser. No. 294,329, Aug. 23, 1994, Pat. No. 5,577,271.

[51] Int. Cl.⁶ .................................................. A42B 1/06
[52] U.S. Cl. ........................ 2/4; 2/10; 2/172; 2/202; 2/207; 2/209.13
[58] Field of Search .......................... 2/4, 6.3, 6.7, 9, 2/10, 172, 175.3, 175.6, 202, 205, 206, 207, 209.13, 423, 424, 173; 351/155

[56] References Cited

U.S. PATENT DOCUMENTS

| | | |
|---|---|---|
| 336,712 | 2/1886 | Garst . |
| 876,452 | 1/1908 | Harrison et al. . |
| 1,350,494 | 8/1920 | Green . |
| 1,716,719 | 6/1929 | Christopher . |
| 2,472,033 | 5/1949 | Wetzel . |
| 4,214,318 | 7/1980 | Gomez . |
| 4,397,044 | 8/1983 | Trepanier ........................ 2/4 |
| 4,422,184 | 12/1983 | Myers . |
| 4,887,316 | 12/1989 | Morandini . |
| 5,091,993 | 3/1992 | Merrill et al. . |
| 5,119,510 | 6/1992 | Schilling . |
| 5,226,189 | 7/1993 | Blutstein . |

*Primary Examiner*—Diana Biefeld
*Attorney, Agent, or Firm*—Rhodes Coats & Bennett

[57] ABSTRACT

Insect protective headgear comprising a headpiece having a crown and a brim with an outer edge extending at least part of the way around the periphery of said crown; a transparent eyepiece releasably attached to the outer edge of the brim; and a knitted tubular veil of pantyhose-type material releasably attached to the lower edge of the eyepiece and to the lower edge of the headpiece.

5 Claims, 2 Drawing Sheets

INSECT BARRIER HEADGEAR

This application is a division of application Ser. No. 08/294,329, filed Aug. 23, 1994, now U.S. Pat. No. 5,577,271.

BACKGROUND OF THE INVENTION

The present invention relates to a garment, specifically headgear, designed to protect its wearer from insect stings and bites by forming an insect-proof barrier around the wearer's head and neck Everyone who ventures outdoors has experienced annoying and often painful, bites and stings from various insects such as mosquitos, flies, sand fleas, and the like. In some instances these bites and stings can also cause health problems, and even death.

Numerous methods have been attempted to deter insects, the most common being chemical repellents and insect barriers. Repellents, while convenient to use, are often smelly and are of limited value. Moreover, some users may be allergic to them. In situations where there are a large number of insects or complete protection is desired, insect barriers are still preferred.

The prior art discloses several different constructions for these barriers. As early as 1886, U.S. Pat. No. 336,712 to Garst described insect barrier headgear comprised of a woven bag of mosquito netting or fine gauze with an elastic or non-elastic bands at its upper edge and a little above its lower edge, with the upper band fitting over the crown of a hat and above its brim. The lower edge of the bag can be weighted to hold it against the wearer's body.

U.S. Pat. No. 876,452 to Harrison et al describes a head screen comprised of a cap with a crown, a band, and a semi-rigid flaring visor; a face protector of fine wire mesh secured to the cap beneath the visor; and mosquito netting secured beneath the cap at the base of the band.

U.S. Pat. No. 2,472,033 to Wetzel discloses a convertible sportsman's hat which has a self-contained insect shield of mosquito netting connected to one of a pair of brims in spaced relation. The shield is concealed between the brims when it is not in use.

U.S. Pat. No. 4,214,318 to Gomez describes a portable roll-up bug netting comprised of a fine mesh netting of plastic material which has a band at its upper edge. The netting is attached to a hat by securing the band around the hat crown. An integral pouch is included for storage.

U.S. Pat. No. 4,397,044 to Trepanier describes a protective bonnet for beekeepers comprised of a veil with annular upper, intermediate and lower portions made of a woven fabric of non-metallic screen. The upper portion fits over a hat with a crown and peripheral edge or flange. An elastic band is sewn into the top edge of the upper portion to hold the top edge securely against the hat's crown. The intermediate portion of the veil includes a transparent plastic window, which is fixed to the veil with a self-adhesive, particularly a hook and loop fastener of the kind sold under the trademark Velcro. The lower portion includes front and back flaps to cover the wearer's bust, and elastic bands which are tied under the wearer's arms to hold the flaps in place.

U.S. Pat. No. 4,422,184 to Myers describes an insect protective garment which includes a hood with a face-covering mesh of an insect excluding material secured to the hood with hook and loop fastener.

U.S. Pat. No. 5,091,993 to Merrill et al describes an insect protective garment which includes a hood to fully cover the wearer's head. The hood is formed of a lightweight semi-rigid insect excluding mesh, such as the screening commonly sold for use in campers or tents.

U.S. Pat. No. 5,119,510 to Schilling similarly relates to an insect protective garment which includes a hood. The hood in this patent is formed of a mesh material referred to as NO-SEE-UM™ mesh used primarily for tent openings.

Insect protective headgear, if it is to be acceptable to the wearer over the long term, must not only be effective in preventing insects, including very small insects, from contacting the wearer's head, but must also be comfortable when worn for extended periods. In addition, the headgear should be convenient to clean, and sections should be replaceable when worn or damaged, without needing to discard the entire headgear. Heretofore, a construction meeting some of these criteria has necessarily sacrificed acceptability in other areas. For example, a construction providing greater protection has resulted in lower wearing comfort. A garment meeting all of these requirements would be of significant utility.

Thus, a primary aspect of the present invention is to provide an improved garment for insect protection which provides a high degree of protection against insects, including very small insects, while being of a construction which allows the wearer a great freedom of movement and comfort. It is a further aspect of the present invention to provide a garment of this nature, and specifically insect protection headgear, which is easily cleaned, and which permits the replacement of parts thereof, and especially the veil portion, without discarding the entire article.

SUMMARY OF THE INVENTION

It has been found that the above requirements can be met with a garment comprised of a headpiece having a crown and a brim extending at least part of the way around the periphery of the crown; a transparent eyepiece attached to the outer edge of the brim at the front of the garment; and a knitted, tubular veil secured to the brim and the eyepiece.

A headgear of this construction is superior to prior art headgear in several respects. The veil is held at a maximum distance from the user's face, resulting in greater comfort. The transparent eyepiece provides improved visibility without fogging. Even tiny insects are prevented from reaching the wearer's face and neck. The veil is highly drapable and stretchable, permitting a great freedom of movement by the wearer. The components of the headgear are releasably attached to each other, permitting quick and easy replacement of any component, thus providing an economical structure.

As used herein, the term "attached" is intended to describe two elements which are affixed or fastened to each other with an attachment means, e.g., hook and loop fastener strips, zippers, hooks, or other fasteners; while the term "secured" is intended to more broadly describe two elements which may be attached to each other, or only held together in physical contact, e.g., two elements which are held in together by an elastic band.

The headpiece used in constructing the garment, may be formed of various materials, such as metal, plastic, or cloth. It may also be of different configurations, such as a conventional hat having an outwardly extending, annular brim or flange extending all of the way around the base or lower edge of the crown, or a headpiece conventionally referred to as a cap, which comprises a crown with a brim or bill extending only part way around the base of the crown. If the brim extends entirely around the headpiece, the width of the brim may be the same around the crown, or it may vary, e.g., by being of a greater diameter at the front of the crown. Various specific embodiments within these broader categories are known, including "hard hats" of molded plastic or shaped metal, so called "safari hats, and semi-rigid fabric hats and caps.

The eyepiece is formed of an impact resistant transparent material. While it is possible to form the eyepiece from glass, the preferred material is a plastic such as acrylic, or a polycarbonate of the type sold under the trademark Lexan. Desirably, the plastic will be light weight and flexible, although molded eyepieces are contemplated. The outer periphery of the eyepiece is defined by an upper edge and a lower edge extending across the bottom of the eyepiece and up its sides to join the upper edge. The upper edge of the eyepiece will normally have a length equal to from about one-third to one-half of the circumference brim's outer edge, if the brim extends entirely around the crown, and a length equal to the outer edge of the brim or bill if the bill only extends part-way around the crown. The lower edge includes a central cut-out section to fit above the wearer's nose. It has been found that this cut-out section prevents moisture exhaled from the wearer's nostrils from fogging the eyepiece. When the eyepiece is to be attached to a cap in combination with a veil which is secured to the back of the crown with an elastic band, as hereinafter described, the eyepiece may also advantageously include upwardly extending projections or wings at its rear ends to hold the eyepiece in an extended position under the tension of the elastic band.

The veil is of a generally tubular configuration having a continuous side wall with an open top with an upper edge and an open bottom with a lower edge. A veil having a uniform circumference along its length will ordinarily be used, although a veil having a diameter which is greater at the bottom than at the top may be useful in some instances, e.g., when it is desired to extend the veil downwardly over the wearer's bust or chest area. The veil may be formed of a continuous circular knit tube, or a flat fabric which is sewn into a tube.

The material from which the veil is constructed is of particular importance in achieving a garment which is effective in preventing the entry of insects, particularly tiny insects, while still allowing freedom of movement and long-wearing comfort to the user. As noted above, the veil used in the garments claimed herein is of a knit construction, instead of the woven construction described in the prior art. It has been found that this construction, particularly having the parameters described herein, can be formed with openings which are small enough, i.e., less than 1 mm, to prevent small insect entry, while still being flexible enough to be comfortably worn.

Preferably, the knit material used for the garments will be formed of yarns having a denier of from about 20 to about 70, and a gauge of at least 28, e.g., from about 32 to 36. Nylon yarns will normally be used, but the fabric may be constructed of other yarns such as polypropylene or polyester. Composite yarns, such as stretch nylon yarns are especially preferred. A commercially and economically available material, is nylon shear used to manufacture pantyhose.

In order to secure the above components together a self-adhesive material, e.g., hook and loop fastener, is attached to the outer edge of the headpiece brim by sewing, gluing, or other technique sufficient to adhere the hook and loop fastener. Another strip of hook and loop fastener or other self-adhesive material is attached to the outer periphery of the eyepiece. In addition, a strip of hook and loop fastener or other self-adhesive material is attached to at least a front section of the upper edge of the veil. In embodiments where the hook and loop fastener as attached to only a part of the upper edge of the veil, an elastic band may be attached to the remainder to the veil's upper edge to secure to veil to the headpiece.

The garment is assembled by attaching the upper edge of the eyepiece to the front section of the outer edge of the brim by joining the hook and loop fastener strips. The front section of the veil upper edge is then attached to the bottom of the eyepiece, and the rear section of the veil upper edge is secured to the rear of the headpiece. When the headpiece comprises a crown with a brim entirely around its base or lower edge, the eyepiece is attached to a front section, normally about one-third to one-half of the brim circumference, and the veil is attached to the bottom of the eyepiece and to the rear section of the brim's outer edge, i.e., the portion of the brim's outer edge not attached to the upper edge of the eyepiece.

When the headpiece is in the configuration of a cap with a brim or bill extending only along the front section of a crown, the upper edge of the eyepiece is attached entirely along the outer edge of the bill, and the veil is attached entirely along the lower edge of the eyepiece and secured to the rear section of the crown base, i.e., the portion of the crown base which is not attached to the bill. The veil may be secured to the crown either with an attachment means which affixes the veil to the crown, e.g., a hook and loop fastener, or the veil may be held against the crown base by a securing means, e.g., an elastic band.

When worn, the garment is secured over the wearer's head with the veil draping downwardly over the wearer's shoulders and bust to form an insect impermeable barrier. Contact of the lower edge of the veil with the wearer's shoulders and chest or bust may be enhanced by a securing means, such as a weight attached to the bottom of the veil, e.g., by sewing, or an elastic band which passes beneath the wearer's arms and joins the bottom rear and front veil sections.

It has been found that the small diameter opening of the knit material used in the present invention prevents entry of very small insects, such as sand fleas, which readily penetrate other materials used in prior art insect protection garments. The garment is still sufficiently flexible, however, to allow unrestricted movement by the wearer, and thus permit the garment to be worn for extended periods. In addition, this flexibility results in a highly drapable garment which conforms to the shape of the wearer's shoulders and chest area, even during movement, thus maintaining an effective seal against insect entry. A woven fabric having opening of this small size, on the other hand, would not have this desired flexibility.

Since the garment is designed to be worn outside under conditions where the veil material will become soiled, and ultimately damaged, the above construction enables the user to readily separate the soiled or damaged veil from the headpiece and eyepiece, and easily replace it with a clean or new veil, thus providing a garment which can be used economically for an extended period of time.

If desired, the veil can be printed with a camouflage pattern to aid in concealment of the wearer in activities such as hunting. Other features of the invention will be apparent to one skilled in the art upon a reading of the detailed description of the invention which follows, taken together with the drawings. In the description, terms such as horizontal, upright, vertical, above, beneath and the like are used solely for the purpose of clarity in illustrating the invention, and should not be taken as words of limitation.

DETAILED DESCRIPTION OF THE INVENTION

Figure 1:
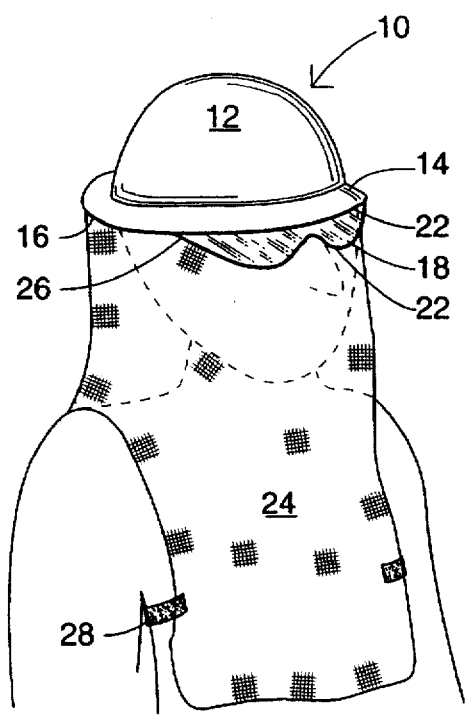
FIG. 1 is a perspective view of the invention in which the headpiece is a hat with hook and loop fastener completely around the periphery of the brim.
Figure 2:
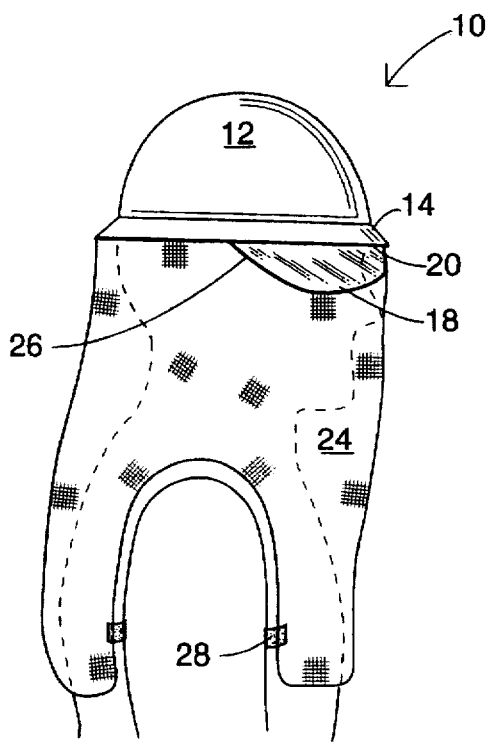
FIG. 2 is a side view of the embodiment shown in FIG. 1.
Figure 5:
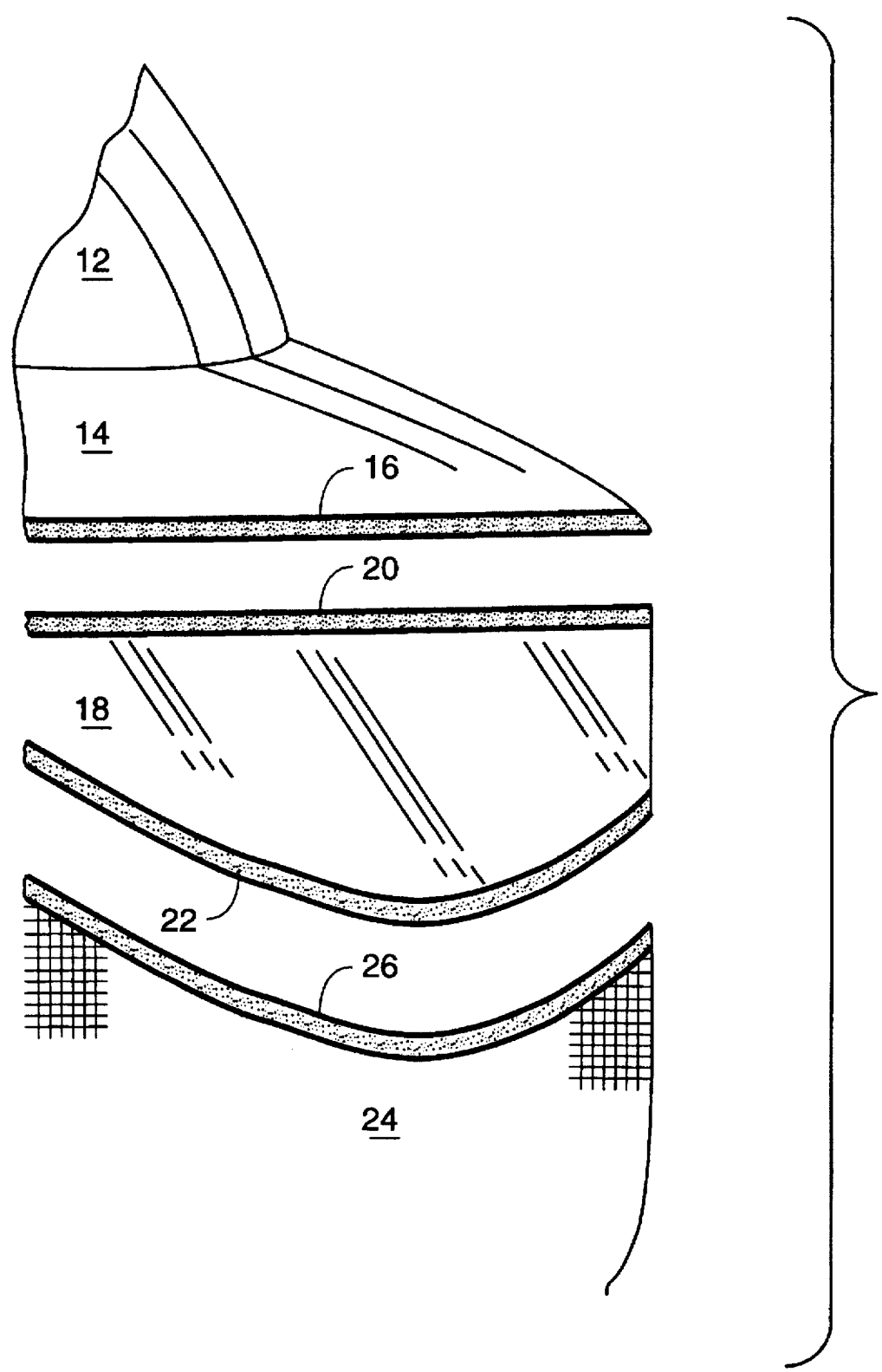
FIG. 5 is an exploded, detailed view of a part of the embodiment shown in FIGS. 1 and 2.

As best shown in FIGS. 1–2 and 5, the preferred embodiment of the present invention is comprised of a headpiece in the configuration of a hat, generally 10, having a crown 12 and an outwardly extending annular brim 14 attached to the base or lower edge of crown 12, and extending entirely around crown 12. Hook and loop fastener strip 16 is glued around the periphery of brim 14 along the bottom of its outer edge.

Eyepiece 18 is formed of transparent plastic with hook and loop fastener strip 20 glued along its upper edge and hook and loop fastener strip 22 glued along its lower edge. Eyepiece 18 is joined to a front section equal to approximately one-half of the circumference of the outer edge of brim 14 by attaching hook and loop fastener strip 16 to hook and loop fastener strip 20.

Veil 24 comprises a tube of knit material having an upper edge to which hook and loop fastener strip 26 is attached by sewing, and a lower edge to which an elastic band 28 extending beneath the wearer's arms is attached to hold the front and back of the veil against the wearer's body. Veil 24 is constructed of relaxed knit pantyhose fabric constructed of stretch nylon yarn.

Veil 24 is attached to the bottom of eyepiece 18 by joining the front section of hook and loop fastener strip 22 to hook and loop fastener strip 26. The rear section of veil 24 is secured to the rear section of the outer edge or periphery of brim 14 by joining the rear section of hook and loop fastener strip 26 to the rear section of hook and loop fastener strip 16.

Figure 3:
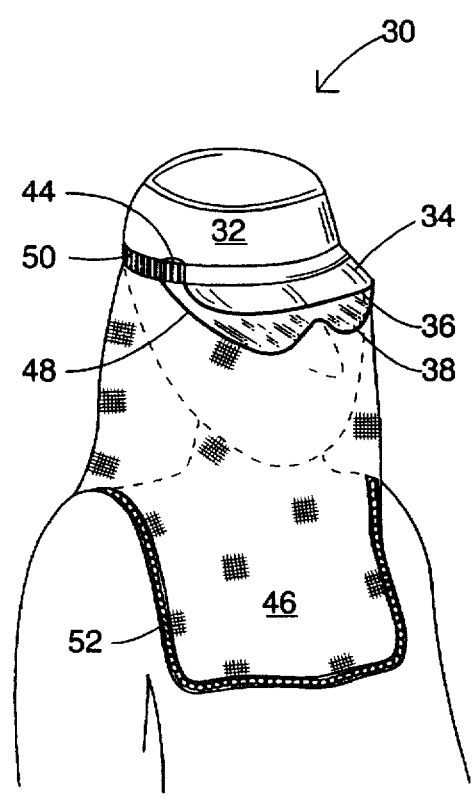
FIG. 3 is a perspective view of an alternative embodiment in which the headpiece is a cap with hook and loop fastener on the periphery of the bill.
Figure 4:
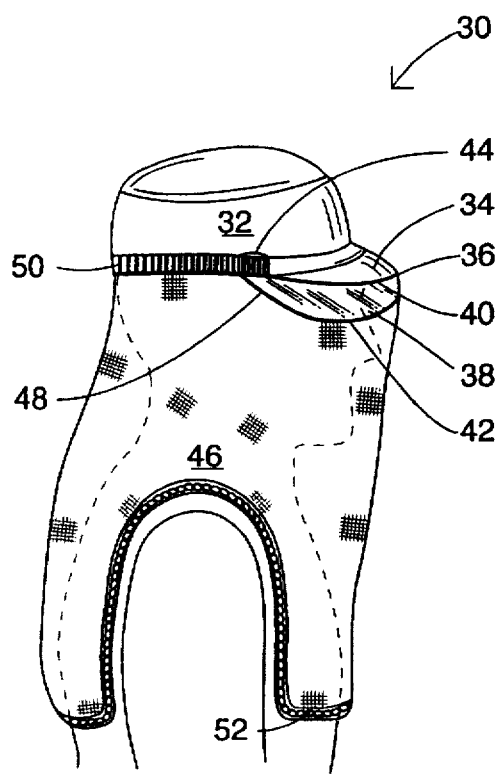
FIG. 4 is a side view of the embodiment shown in FIG. 4.

The alternative embodiment shown in FIGS. 3–4, is comprised of a headpiece in the configuration of a cap, generally 30, having a crown 32 and a bill 34 extending along the front section of crown 32 and integral with the base or lower edge of crown 32. Hook and loop fastener strip 36 is glued around the periphery of bill 34 along the bottom of its outer edge. Plastic eyepiece 38 has a hook and loop fastener strip 40 glued along its upper edge and hook and loop fastener strip 42 glued along its lower edge. The rear ends of the eyepiece terminate in upwardly extending projections or wings 44, with hook and loop fastener strip 42 continuing along the back edge of wing 44. Eyepiece 38 is joined to the outer edge of bill 34 by attaching hook and loop fastener strips 40 and 36.

Veil 46 is formed of a tube of knit material having the same construction as that used to form veil 24. Veil 46, however, has a hook and loop fastener strip 48 sewn along the front of its upper edge, and an elastic band 50 sewn in a relaxed state along the rear of its upper edge. A chain 52 is sewn along the lower edge of veil 46 to help secure veil 46 to the wearer's body. Veil 46 is attached to the bottom of eyepiece 38 by joining hook and loop fastener strip 42 to hook and loop fastener strip 48. The rear section of veil 46 is secured to the rear periphery of crown 32 by stretching elastic band 50 over the base of crown 32. The tension exerted by stretched band 50 against wing 44, tends to maintain eyepiece 38 in an extended position.

Certain modifications and improvements will occur to those skilled in the art upon a reading of the foregoing description. By way of example, the plastic material used to form the eyepiece can be shaded to serve as sunglasses. It should be understood that all such modifications and improvements have been deleted herein for the sake of conciseness and readability but are properly within the scope of the following claims.

What is claimed is:

1. Insect protective headgear comprising
    (a) a crown having a front edge and a rear edge;
    (b) an outwardly extending bill having an inner edge attached to the front edge of said crown, and an outer edge;
    (c) a transparent eyepiece having an upper edge attached to the outer edge of said bill, a lower edge, and rearwardly extending ends;
    (d) a tubular veil having a continuous upper edge attached to the lower edge of said eyepiece and secured to the rear edge of said crown.

2. The headgear of claim 1, wherein said veil is secured to the rear of said crown with elastic tape.

3. The headgear of claim 1, further including upwardly extending projections attached to the ends of said eyepiece.

4. The headgear of claim 1, wherein said veil comprises a knitted fabric of stretch nylon.

5. The headgear of claim 1, further including a first hook and loop fastener strip attached to the outer edge of said bill, a second hook and loop fastener strip attached to the upper edge of said eyepiece, a third hook and loop fastener strip attached at the front of the upper edge of said veil, and an elastic band attached at the rear of the upper edge of said veil.

* * * * *